United States Patent
Yan

(10) Patent No.: US 11,352,278 B2
(45) Date of Patent: Jun. 7, 2022

(54) METHOD FOR TREATING DOMESTIC SEWAGE

(71) Applicant: XIAMEN UNIVERSITY OF TECHNOLOGY, Fujian (CN)

(72) Inventor: Bin Yan, Fujian (CN)

(73) Assignee: XIAMEN UNIVERSITY OF TECHNOLOGY, Fujian (CN)

( * ) Notice: Subject to any disclaimer, the term of this patent is extended or adjusted under 35 U.S.C. 154(b) by 190 days.

(21) Appl. No.: 16/769,924

(22) PCT Filed: Apr. 30, 2019

(86) PCT No.: PCT/CN2019/085159
§ 371 (c)(1),
(2) Date: Jun. 4, 2020

(87) PCT Pub. No.: WO2020/015435
PCT Pub. Date: Jan. 23, 2020

(65) Prior Publication Data
US 2021/0188676 A1   Jun. 24, 2021

(30) Foreign Application Priority Data
Jul. 17, 2018   (CN) .......................... 201810784970.3

(51) Int. Cl.
| | | |
|---|---|---|
| C02F 3/30 | (2006.01) | |
| B01D 69/02 | (2006.01) | |
| B01D 69/08 | (2006.01) | |
| B01D 71/06 | (2006.01) | |
| C02F 1/00 | (2006.01) | |
| C02F 3/12 | (2006.01) | |
| C02F 3/28 | (2006.01) | |
| C02F 101/16 | (2006.01) | |

(52) U.S. Cl.
CPC .............. *C02F 3/301* (2013.01); *B01D 69/02* (2013.01); *B01D 69/08* (2013.01); *B01D 71/06* (2013.01); *C02F 1/001* (2013.01); *C02F 3/1268* (2013.01); *C02F 3/2853* (2013.01); *B01D 2325/02* (2013.01); *C02F 2101/163* (2013.01); *C02F 2101/166* (2013.01)

(58) Field of Classification Search
CPC ........ C02F 3/301; C02F 1/001; C02F 3/1268; C02F 3/2853; C02F 2101/163; C02F 2101/166; B01D 69/02; B01D 69/08; B01D 71/06; B01D 2325/02
See application file for complete search history.

(56) References Cited

U.S. PATENT DOCUMENTS 7,597,808 B2   10/2009   Shiotani
2018/0093228 A1   4/2018   Yan et al.

FOREIGN PATENT DOCUMENTS

| CN | 1544351 A | 11/2004 |
|---|---|---|
| CN | 2915846 Y | 6/2007 |
| CN | 101774690 A | 7/2010 |
| CN | 102260009 B | 1/2013 |
| CN | 103265151 A | 8/2013 |
| CN | 103724668 A | 4/2014 |
| CN | 103936146 B | 5/2015 |
| CN | 205653227 U | 10/2016 |
| CN | 107055765 A | 8/2017 |
| CN | 108911134 A | 11/2018 |
| CN | 108911136 A | 11/2018 |
| CN | 108911137 A | 11/2018 |
| JP | S62102896 A | 5/1987 |
| JP | 11244877 A | 9/1999 |
| JP | 2007152179 A | 6/2007 |
| JP | 2013255919 A | 12/2013 |
| JP | 2016013537 A | 1/2016 |
| JP | 2017164739 A | 9/2017 |
| KR | 20020094950 A | 12/2002 |
| KR | 20170014568 A | 2/2017 |
| WO | 2011059218 A2 | 5/2011 |

OTHER PUBLICATIONS

English Translation of International Search Report from International Application No. PCT/CN2019/085159 dated Jul. 22, 2019 (2 pages).
Li, Jingmei et al., Decolorization of Dyeing Effluents with A/O Type Sequencing Batch MBR Method, Dyeing & Finishing, No. 3, 01 Feb. 1, 2009.
Li, Jingmei et al., Influences of HRT on Dyeing Effluents Treatment with A/O Type Sequencing Batch MBR, Dyeing & Finishing, No. 16, 15 Aug. 15, 2009.
Search Report for International Application No. PCT/CN2019/085158 dated Jul. 16, 2019.
English Translation of International Search Report from International Application No. PCT/CN2019/088534 dated Aug. 9, 2019 (3 pages).
Office Action from U.S. Appl. No. 16/769,914 dated Jul. 21, 2021.

*Primary Examiner* — Ryan B Huang
(74) *Attorney, Agent, or Firm* — Calfee Halter & Griswold LLP

(57) ABSTRACT

A method for treating domestic sewage includes: preliminarily treating the domestic sewage through a grating and a grit chamber, so as to remove large-particle solids in the domestic sewage; and subjecting the domestic sewage after the preliminary treatment to circulating anaerobic-oxic treatment in a membrane bioreactor (MBR). In the oxic treatment process, microorganisms oxidize nitrogen in the sewage into nitrite or nitrate. Under anaerobic conditions, denitrifying bacteria in the microorganisms reduce the nitrate, releasing molecular nitrogen or nitrous oxide. In the present invention, the MBR is filled with a quinone-based hollow fiber membrane. During the microbial denitrification, the quinone acts as an electron transfer carrier to participate in the denitrification to promote the reduction of the nitrate (nitrite), increasing the denitrification rate under anaerobic conditions, and achieving the purpose of efficient denitrification.

10 Claims, 1 Drawing Sheet

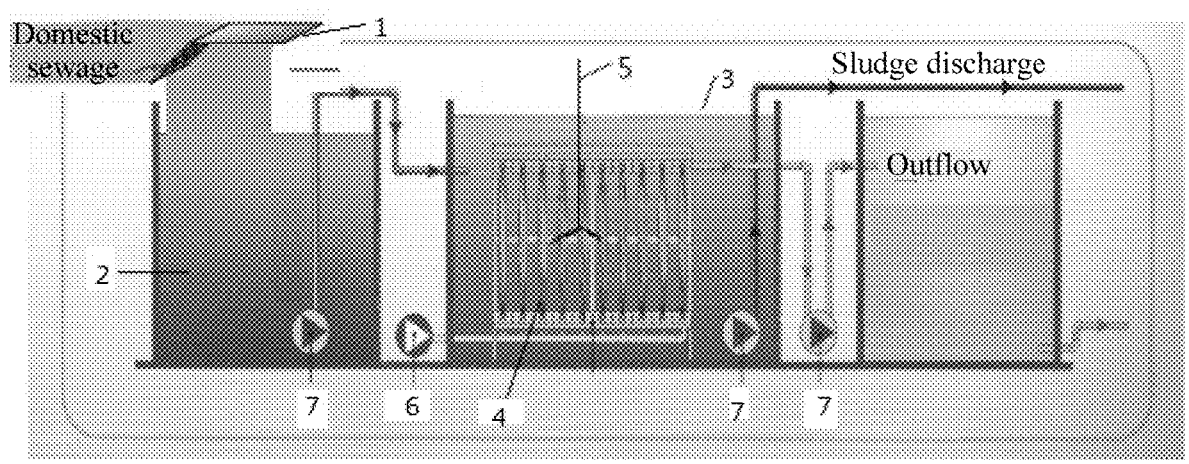

METHOD FOR TREATING DOMESTIC SEWAGE

CROSS-REFERENCE TO RELATED APPLICATIONS

The present application is the National Stage of International Application No. PCT/CN2019/085159, filed Apr. 30, 2019, which claims priority to the Chinese Patent Application No. 201810784970.3, filed with the China National Intellectual Property Administration (CNIPA) on Jul. 17, 2018, and entitled "METHOD FOR TREATING DOMESTIC SEWAGE", which are incorporated herein by reference in their entireties.

TECHNICAL FIELD

The present invention relates to the technical field of wastewater treatment, and in particular to a method for treating domestic sewage.

BACKGROUND

Domestic sewage is wastewater discharged from the daily life of residents, mainly from toilets of residential buildings and public buildings, such as houses, institutions, schools, hospitals, shops, public places and industrial enterprise buildings. Domestic sewage contains organic pollutants (such as protein, carbohydrate, fat, urea ammonia nitrogen) and a large number of pathogenic microorganisms (such as parasitic eggs and intestinal infectious viruses). Although the conventional biochemical treatment processes effectively reduces the chemical oxygen demand (COD), biochemical oxygen demand (BOD) and total suspended solids (SS) in the sewage, they can only remove 10% to 20% of nitrogen in the sewage. As a result, a large amount of nitrogen-containing sewage is discharged into the water body, causing the pollution and eutrophication of important water sources, rivers and lakes.

During the conventional oxic treatment process, microorganisms oxidize nitrogen in the sewage into nitrite or nitrate. Under anoxic conditions, denitrifying bacteria reduce the nitrate, releasing molecular nitrogen ($N_2$) or nitrous oxide ($N_2O$), thereby removing nitrogen from the water body. This process is called a denitrification process, which uses $NO_2^-$ and $NO_3^-$ as the final electron acceptors of respiration to reduce nitric acid to nitrogen ($N_2$).

In recent years, domestic and foreign scholars have developed many biological denitrification processes based on the above principles. The classic processes include anaerobic/oxic process (A/O), anaerobic/anoxic/oxic process (A2/O), University of Cape Town process (UCT), 5-stage Bardenpho process and PhoStrip process, etc. They adopt a combined oxic-facultative (anoxic) mode, which uses denitrifying bacteria in the anoxic process to remove nitrogen, so as to reduce nitrogen in the discharged sewage. However, the existing processes still have many drawbacks. Their innovation only changes the parameters from the engineering perspective, lack of in-depth study of biological factors in the system. Therefore, they fail to control the processes from the microbiological perspective, and have low removal rate of nitrogen in the sewage, which is merely 55-60%.

SUMMARY

In order to overcome the above shortcomings of the prior art, the present invention provides a method for treating domestic sewage with high denitrification rate and simple operation.

To achieve the above purpose, the present invention provides the following technical solution.

A method for treating domestic sewage includes the following steps:
preliminarily treating the domestic sewage through a grating and a grit chamber in sequence; and
subjecting the domestic sewage after the preliminary treatment to circulating anaerobic-oxic treatment in an MBR filled with a quinone-based hollow fiber membrane.

Preferably, the quinone-based hollow fiber membrane in the MBR has a running flux of 10 L/($m^2$·h) and an average pore size of 0.1 μm.

Preferably, the quinone-based hollow fiber membrane comprises greater than 5% by mass of quinone.

Preferably, a sludge concentration in the MBR is 4-6 g/L.

Preferably, during the circulating anaerobic-oxic treatment, the time of single anaerobic treatment is 50-70 min.

Preferably, a redox potential in the anaerobic treatment is −50 mV to 0 mV.

Preferably, during the circulating anaerobic-oxic treatment, the time of single oxic treatment is 20-40 min.

Preferably, dissolved oxygen (DO) in the oxic treatment is 1-3 mg/L.

Preferably, the wastewater after the preliminary treatment has a hydraulic retention time (HRT) of 4-6 h in the MBR.

Compared with the prior art, the present invention has the follow advantages:

The present invention provides a method for treating domestic sewage, including: preliminarily treating the domestic sewage through a grating and a grit chamber, so as to remove large-particle solids in the domestic sewage; and subjecting the domestic sewage after the preliminary treatment to circulating anaerobic-oxic treatment in an MBR. In the oxic treatment process, microorganisms oxidize nitrogen in the sewage into nitrate or nitrite. Under anaerobic conditions, denitrifying bacteria in the microorganisms reduce the nitrite or nitrate, releasing molecular nitrogen ($N_2$) or nitrous oxide ($N_2O$). In the present invention, the MBR is filled with a quinone-based hollow fiber membrane. During the microbial denitrification, the quinone acts as an electron transfer carrier to participate in the denitrification to promote the reduction of the nitrate (nitrite), increasing the denitrification rate under anaerobic conditions. In this way, the present invention achieves the purpose of efficient denitrification and the simultaneous removal of chemical oxygen demand (COD) and nitrogen. The results of the examples show that by treating the domestic sewage by the method provided by the present invention, the COD in the effluent is less than 20 mg/L, the total nitrogen (TN) is less than 5 mg/L, and the total suspended solids (SS) is 0.

BRIEF DESCRIPTION OF DRAWINGS

FIG. 1 is a flowchart of treating domestic sewage according to an example of the present invention.

REFERENCE NUMERALS 1. grating; 2. grit chamber; 3. MBR; 4. quinone-based hollow fiber membrane; 5. agitator; 6. aeration device; and 7. pump.

DETAILED DESCRIPTION

The present invention is further described below with reference to the accompanying drawings and examples.

The present invention provides a method for treating domestic sewage, including the following steps:

preliminarily treat the domestic sewage through a grating and a grit chamber in sequence; and subject the domestic sewage after the preliminary treatment to circulating anaerobic-oxic treatment in a membrane bioreactor (MBR) filled with a quinone-based hollow fiber membrane.

The present invention preliminarily treats the domestic sewage through a grating and a grit chamber in sequence. The present invention has no special requirement for the source of the domestic sewage, and wastewater discharged from daily life and from the toilets of residential buildings and public buildings, such as houses, institutions, schools, hospitals, shops, public places and industrial enterprise buildings can be treated by the method of the present invention. In a specific example of the present invention, the chemical oxygen demand (COD) of the domestic wastewater is preferably greater than 200 mg/L, the total nitrogen (TN) is preferably greater than 30 mg/L, and the total suspended solids (SS) is preferably greater than 50 mg/L.

The present invention has no special requirement for the specific treatment process of the grit chamber and the grating, and a process well known to those skilled in the art can be used. The present invention removes large-particle solids that can be removed by gravity through the grit chamber, and intercepts large-particle solids suspended in the sewage through the grating.

The present invention subjects the domestic sewage after the preliminary treatment to circulating anaerobic-oxic treatment in an MBR filled with a quinone-based hollow fiber membrane. In the present invention, the MBR is an anaerobic-oxic membrane bioreactor (AOMBR). The AOMBR is filled with a quinone-based hollow fiber membrane. The AOMBR is provided with an agitator in the center for agitating during the anaerobic treatment process. The AOMBR is also provided with an aeration device at the bottom for aerating to provide oxygen for the oxic treatment process. In the present invention, the circulation of the domestic sewage is preferably realized by a pump.

In the present invention, the MBR is filled with a quinone-based hollow fiber membrane. The running flux of the quinone-based hollow fiber membrane is preferably greater than or equal to 10 L/(m²·h), and more preferably 10-15 L/(m²·h). The quinone-based hollow fiber membrane includes preferably greater than 5%, more preferably 10-15% by mass of quinone. The average pore diameter of the quinone-based hollow fiber membrane is preferably 0.1 μm. In a specific example of the present invention, 1 m² area of membrane filament filters at least 10 L of wastewater in 1 h. The present invention preferably determines the total area of the hollow fiber membrane according to the amount of the domestic sewage to be treated. The present invention has no special requirement for the source of the quinone-based hollow fiber membrane, and that purchased directly or prepared can be used. In a specific example of the present invention, the quinone-based hollow fiber membrane can specifically be an anthraquinone functionalized polyvinylidene fluoride membrane, which can be prepared according to a method well known to those skilled in the art. The present invention has no special requirement for the filling method of the quinone-based hollow fiber membrane, and a filling method well known to those skilled in the art can be used.

The present invention has no special requirement for the inflow rate of the domestic sewage after the preliminary treatment in the MBR. In a specific example of the present invention, the specific inflow rate is determined according to factors such as the amount of the sewage to be treated and the cross-sectional area of an inlet pipe.

In the present invention, the sludge concentration in the MBR is preferably 7-8 g/L, and more preferably 7.5 g/L. The present invention has no special requirement for the type of the sludge, and sewage treatment sludge well known to those skilled in the art can be used.

In the present invention, the domestic sewage after the preliminary treatment is firstly subjected to anaerobic treatment and then oxic treatment in the MBR, and the treatment is sequentially cycled. In the present invention, during the circulating anaerobic-oxic treatment, the time of single anaerobic treatment is preferably 50-70 min, and more preferably 60 min. The redox potential in the anaerobic treatment is preferably −50 mV to 0 mV, and more preferably −40 mV to −30 mV. The present invention preferably performs the anaerobic treatment while agitating at the speed of preferably 5 rpm or less, and more preferably 3-4 rpm. In the present invention, the sludge is suspended in the water by agitating to fully contact with the quinone-based hollow fiber membrane, so as to avoid the reduction of the reaction efficiency due to sludge deposition. The present invention preferably provides a hydraulic agitator in the MBR. In order to avoid touching the hollow fiber membrane during the agitating process, the present invention preferably fills the hollow fiber membrane around the MBR and disposes the hydraulic agitator in the center of the MBR.

In the present invention, the hollow fiber membrane includes a quinone. During the microbial denitrification, the quinone acts as an electron transfer carrier to participate in the denitrification to promote the reduction process of the nitrate (nitrite), increasing the denitrification rate in the anaerobic treatment process, and achieving the purpose of efficient denitrification. The present invention utilizes the anaerobic treatment to reduce the nitrate nitrogen in the domestic sewage to nitrogen. Meanwhile, the present invention decomposes the high molecular weight organic matter in the wastewater into low molecular weight organic matter, thereby reducing the COD of the domestic sewage.

In the present invention, during the circulating anaerobic-oxic treatment, the time of single oxic treatment is preferably 20-40 min, and more preferably 30 min. The dissolved oxygen (DO) in the oxic treatment is preferably 1-3 mg/L, and more preferably 2 mg/L. The present invention preferably aerates to provide oxygen for the oxic treatment. The aeration process causes the sewage to be agitated, so the oxic treatment process does not need an agitator. The present invention preferably provides an aeration device at the bottom of the MBR. The present invention has no special requirement for the aeration device, and an aeration device well known to those skilled in the art can be used to provide oxygen for the oxic treatment. During the aerobic treatment process, the ammonia nitrogen in the domestic sewage is oxidized to nitrate nitrogen or nitrous nitrogen, and the small molecular weight organic matter in the domestic sewage is decomposed into inorganic substances, which further reduces the COD of the domestic sewage.

In the present invention, the hydraulic retention time (HRT) of the domestic sewage after the preliminary treatment in the MBR is preferably 4-6 h, and more preferably 5 h. During the HRT, the circulating anaerobic-oxic treatment is performed for more than 2 cycles.

In a specific example of the present invention, after the preliminary treatment, the domestic sewage is preferably first subjected to the anaerobic treatment in the MBR. The aeration device is turned off and the agitator is turned on to perform the anaerobic treatment for 50-70 min. Then the agitator is turned off and the aeration device is turned on to perform the oxic treatment for 20-40 min. Then the anaerobic treatment is performed, and the operations are repeated until the HRT of the domestic sewage after the preliminary treatment in the MBR reaches 4-6 h. The sewage is discharged after the treatment. In the present invention, the wastewater is preferably discharged in the oxic treatment stage. The aeration treatment in the oxic treatment stage causes the membrane filament to be agitated, so the sludge is not easy to adhere to the surface of the membrane filament when the wastewater is discharged. In the anaerobic treatment stage, since the agitating force on the membrane filament is insufficient, the sludge will adhere to the surface of the membrane filament when the wastewater is discharged, causing pollution of the membrane filament and affecting the outflow rate.

The sewage treatment process of the present invention is shown in FIG. 1. The domestic sewage flows through the grit chamber 1 and the grating 2 for preliminary treatment. After the preliminary treatment, the domestic sewage enters the MBR (AOMBR) 3 for circulating anaerobic-oxic treatment. The MBR is filled with the quinone-based hollow fiber membrane 4. During the anaerobic treatment, the agitator 5 is turned on and the aeration device 6 is turned off. During the oxic treatment, the agitator 5 is turned off and the aeration device 6 is turned on. The circulation of the sewage in the treatment process is realized by a pump 7. After the circulating treatment, the sewage that meets the standard is led through a suction pump to a discharge port of the sewage treatment system for discharge. The present invention has no special requirement for the treatment method of the sludge in the MBR, and a treatment method well known to those skilled in the art can be used. In a specific example of the present invention, the sludge is preferably regularly discharged to ensure the effect of wastewater treatment.

The solutions provided by the present invention are described in detail below with reference to the examples, but the examples should not be construed as a limitation to the protection scope of the present invention.

Example 1

In the domestic sewage, the initial COD was 400 mg/L, the initial TN was 40 mg/L, and the initial SS was 200 mg/L.

The domestic sewage was preliminarily treated through a grating and a grit chamber.

After the preliminary treatment, the domestic sewage entered an AOMBR for circulating anaerobic-oxic treatment. The reactor was filled with a membrane filament, which was a quinone-based hollow fiber membrane.

The sludge concentration in the AOMBR was 4 g/L. The AOMBR performed anaerobic treatment by hydraulically agitating for 60 min at the redox potential of −50 mV (without aeration). Then the AOMBR performed oxic treatment for 30 min by aerating and controlling the DO to be 3 mg/L (without agitation). In the oxic treatment process, the HRT was 5 h, and the wastewater was discharged through the membrane filament after meeting the standard.

The COD, TN and SS in the domestic sewage after treatment were tested, as shown in Table 1.

TABLE 1

Changes in the quality of domestic sewage before and after treatment

| Process | | AOMBR |
|---|---|---|
| Inflow | COD (mg/L) | 400 |
| | TN (mg/L) | 40 |
| | SS (mg/L) | 200 |
| Outflow | COD (mg/L) | <20 |
| | TN (mg/L) | <5 |
| | SS (mg/L) | 0 |

Table 1 shows that the COD, TN and SS in the untreated domestic sewage were very high, and after the treatment by the AOMBR, the COD in the effluent was less than 20 mg/L, the TN was less than 5 mg/L, and the SS was completely removed. The method for treating domestic sewage provided by the present invention achieved a denitrification rate of about 87.5%, achieving the purpose of efficient denitrification and simultaneous removal of the ammonia nitrogen and COD.

Example 2

In the domestic sewage, the initial COD was 320 mg/L, the initial ammonia nitrogen was 62 mg/L, and the initial SS was 85 mg/L.

The domestic sewage was preliminarily treated through a grating and a grit chamber.

After the preliminary treatment, the domestic sewage entered an AOMBR filled with a membrane filament, which was a quinone-based hollow fiber membrane.

The sludge concentration in the AOMBR was 6 g/L. The AOMBR performed anaerobic treatment by hydraulically agitating for 60 min at the redox potential of −20 mV (without aeration). Then the AOMBR performed oxic treatment for 30 min by aerating and controlling the DO to be 2.5 mg/L (without agitation). In the oxic treatment process, the HRT was 5.5 h, and the wastewater was discharged through the membrane filament after meeting the standard.

The COD, TN and SS in the domestic sewage after treatment were tested, as shown in Table 2.

TABLE 2

Changes in the quality of domestic sewage before and after treatment

| Process | | AOMBR |
|---|---|---|
| Inflow | COD (mg/L) | 320 |
| | TN (mg/L) | 62 |
| | SS (mg/L) | 85 |
| Outflow | COD (mg/L) | <20 |
| | TN (mg/L) | <5 |
| | SS (mg/L) | 0 |

Table 2 shows that after the treatment, the COD in the domestic sewage was less than 20 mg/L, the TN was less than 5 mg/L, and the SS was completely removed. The method for treating domestic sewage provided by the present invention achieved a denitrification rate of about 91.9%, achieving the purpose of efficient denitrification and simultaneous removal of the ammonia nitrogen and COD.

The above description of the examples is intended to help understand the method and core idea of the present invention. It should be noted that, several improvements and modifications may be made by persons of ordinary skill in the art without departing from the principle of the present invention, and these improvements and modifications should also be considered within the protection scope of the present invention. Various modifications to these examples are readily apparent to persons skilled in the art, and the generic principles defined herein may be practiced in other examples without departing from the spirit or scope of the invention. Thus, the present invention is not limited to the examples shown herein but falls within the widest scope consistent with the principles and novel features disclosed herein.

What is claimed is:

1. A method for treating domestic sewage, comprising the following steps:
   preliminarily treating the domestic sewage through a grating and a grit chamber in sequence; and
   subjecting the domestic sewage after the preliminary treatment to a circulating anaerobic-oxic treatment in a membrane bioreactor (MBR) filled with a quinone-based hollow fiber membrane.

2. The treatment method according to claim 1, wherein the quinone-based hollow fiber membrane in the MBR has a running flux of 10 L/(m²·h) and an average pore size of 0.1 μm.

3. The treatment method according to claim 1, wherein the quinone-based hollow fiber membrane comprises greater than 5% by mass of quinone.

4. The treatment method according to claim 1, wherein a sludge concentration in the MBR is 4-6 g/L.

5. The treatment method according to claim 1, wherein during the circulating anaerobic-oxic treatment, the time of a single anaerobic treatment is 50-70 min.

6. The treatment method according to claim 5, wherein a redox potential in the single anaerobic treatment is −50 mV to 0 mV.

7. The treatment method according to claim 1, wherein during the circulating anaerobic-oxic treatment, the time of a single oxic treatment is 20-40 min.

8. The treatment method according to claim 7, wherein dissolved oxygen (DO) levels in the oxic treatment are 1-3 mg/L.

9. The treatment method according to claim 1, wherein the domestic sewage after the preliminary treatment has a hydraulic retention time (HRT) of 4-6 h in the MBR.

10. The treatment method according to claim 2, wherein the quinone-based hollow fiber membrane comprises greater than 5% by mass of quinone.

\* \* \* \* \*